A. W. MORGAN.
Baking-Pan.
No. 227,814.
Patented May 18, 1880.
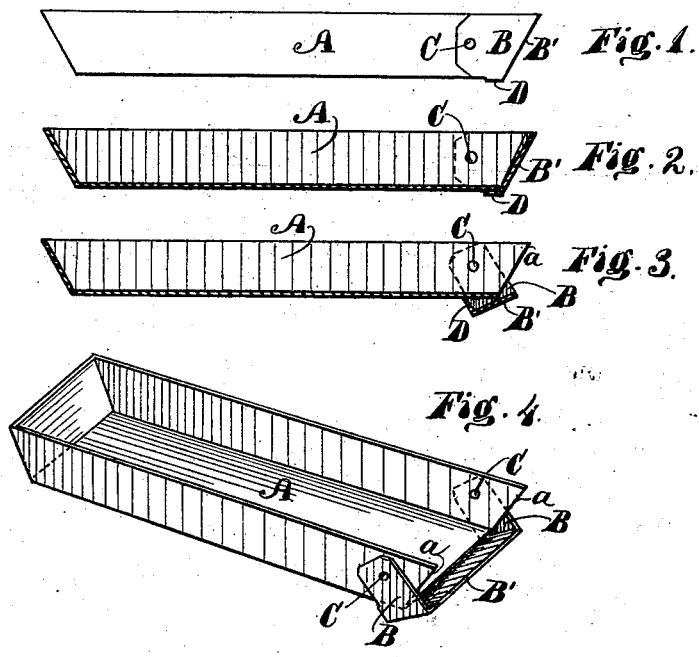

UNITED STATES PATENT OFFICE.

ALFRED W. MORGAN, OF INDIANAPOLIS, INDIANA.

BAKING-PAN.

SPECIFICATION forming part of Letters Patent No. 227,814, dated May 18, 1880.

Application filed February 27, 1880.

*To all whom it may concern:*

Be it known that I, ALFRED W. MORGAN, of Indianapolis, in the county of Marion and State of Indiana, have invented a new and useful Baking-Pan, of which the following is a specification.

My invention relates to an improvement in baking-pans in which one end of the pan is provided with ears and the bottom is provided with a flange, which operates in conjunction with the sides and bottom of the pan; and the object of my improvement is to provide the open end of a pan with an adjustable end having ears pivoted to the open ends of each side of the pan, by means of which the open end of the pan is strengthened, and the pivoted end may be either folded up to form a tight pan for baking or be folded down so that the under surface of the contents of the pan may be examined and the contents removed without injury thereto.

This object I attain by the mechanism illustrated in the accompanying drawings, in which—

Figure 1 represents a side elevation of the device, showing the adjustable folding end closed. Fig. 2 is a longitudinal vertical section of the same. Fig. 3 also is a longitudinal vertical section same as in Fig. 2, but showing the adjustable end folded down; and Fig. 4 is a perspective view of the entire device, showing the adjustable folding end open.

Like letters refer to similar parts in the various views.

A represents an ordinary bake-pan with one end removed. B' is the folding end, which is provided with two ears, B, one at each end, which are pivoted to the sides of the pan by rivets C C'. The lower edge, D, of the folding end B' is bent at an angle to form a joint at the end of the pan-bottom, as shown in Figs. 1 and 2, and prevent the contents—such, for instance, as the dough used for bread, cakes, pies, &c.—from running out at the joint.

When it becomes necessary during the baking process to examine the condition of the bread, cake, &c., at the bottom of the pan, the end B' is folded down and the cooked material raised up to view. When it is desired to remove the cooked material from the pan the end B' is turned down, and the cooked material slipped out at the end. Should any dough be inclined to stick to the pan it may be loosened by inserting any thin metallic plate or knife between it and the pan-bottom from the open end.

What I claim as new is—

In combination with the baking-pan A, having one end open, the adjustable folding end B', having an ear, B, at each end thereof, said ears being pivoted to the ends of the sides of the pan, and said end B' also having an angular part, D, below, to come in contact with the bottom of the pan A to form a snug joint at the open end when the adjustable end is closed up tightly, as described and set forth.

In testimony whereof I have signed my name to this specification in the presence of two subscribing witnesses.

ALFRED W. MORGAN.

Witnesses:
E. O. FRINK,
G. H. BENNETT.